United States Patent [19]

Nielson et al.

[11] 4,279,753

[45] Jul. 21, 1981

[54] WASTEWATER TREATMENT SYSTEM INCLUDING MULTIPLE STAGES OF ALTERNATE AEROBIC-ANEROBIC BIOREACTORS IN SERIES

[75] Inventors: Niel E. Nielson, Mountain View; Ronald L. Kreiling, Danville; Robert C. Hill, Santa Clara; Ralph A. Nice, Burlingame, all of Calif.

[73] Assignee: Arco Environmental Company, Los Angeles, Calif.

[21] Appl. No.: 21,556

[22] Filed: Mar. 19, 1979

[51] Int. Cl.³ ............................................... C02F 3/30
[52] U.S. Cl. .................................... 210/605; 210/615; 210/630; 210/903
[58] Field of Search .................. 210/16, 17, 150, 605, 210/615–618, 621, 630, 903

[56] References Cited

U.S. PATENT DOCUMENTS

| | | | |
|---|---|---|---|
| 3,112,261 | 11/1963 | Porter et al. | 210/17 |
| 3,563,888 | 2/1971 | Klock | 210/17 X |
| 3,617,541 | 11/1971 | Pan | 210/17 |
| 3,871,999 | 3/1975 | Torpey | 210/903 X |
| 3,994,802 | 11/1976 | Casey et al. | 210/605 |
| 4,011,156 | 3/1977 | Dubach et al. | 210/16 X |
| 4,088,571 | 5/1978 | Helgesson | 210/17 |
| 4,126,544 | 11/1978 | Baensch et al. | 210/16 X |

OTHER PUBLICATIONS

Barnard, "Biological Nutrient Removal Without the Addition of Chemicals", *Water Research*, (Pergamon Press), vol. 9, pp. 485–490, (1975).
Drews et al., "Nitrogen Elemination, etc.", *Water Research*, (Pergamon Press), vol. 7, pp. 1183–1194, (1973).
B. F. Goodrich Information Bulletin VC 2.1–276.

*Primary Examiner*—Thomas G. Wyse
*Attorney, Agent, or Firm*—Flehr, Hohbach, Test, Albritton & Herbert

[57] ABSTRACT

Method and apparatus for the treatment of industrial or municipal wastewater including multiple series of alternating aerobic-anaerobic bioreactors in series. Each of such pairs includes fill supporting fixed film microorganisms. The wastewater from primary treatment flows into a first aeration bioreactor and downwardly through the fill where it is contacted by the microorganisms. The effluent is passed to the bottom of an anaerobic bioreactor for passage upwardly past submerged microorganisms affixed to the fill walls. Part of the nutrients in the wastewater are consumed in this first aerobic-anaerobic stage. The wastewater is then passed to a second and third aerobic-anaerobic bioreactor stage. Incremental consumption of organic nutrients, nitrification and denitrification occurs in each stage. Thereafter, it is subjected to tertiary treatment.

9 Claims, 1 Drawing Figure

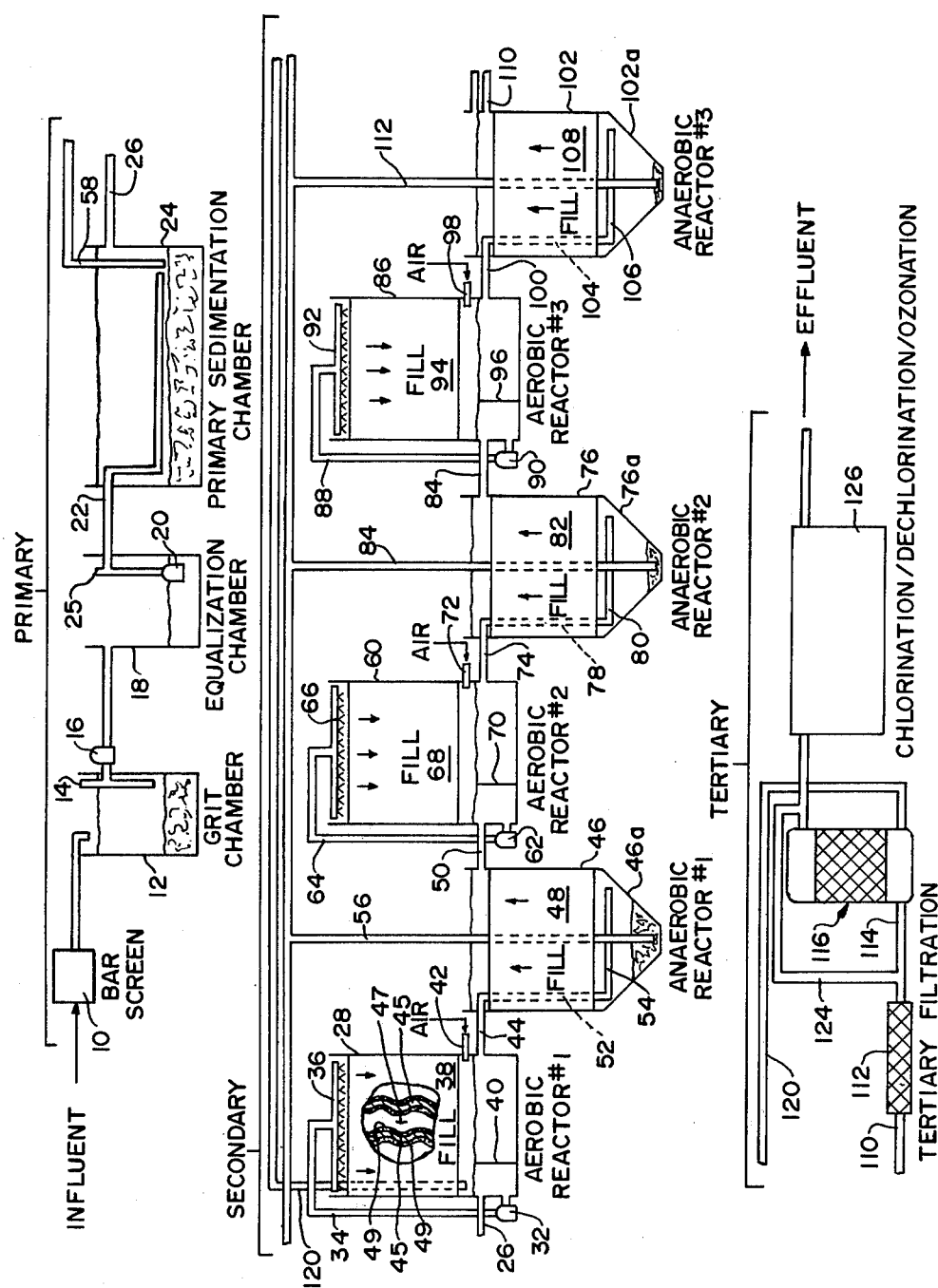

WASTEWATER TREATMENT SYSTEM INCLUDING MULTIPLE STAGES OF ALTERNATE AEROBIC-ANEROBIC BIOREACTORS IN SERIES

BACKGROUND OF THE INVENTION

The present invention relates to combined primary-secondary-tertiary wastewater system and, more specifically, relates to the use of alternate aerobic-anaerobic stage secondary treatment.

In one secondary wastewater treatment system, activated sludge is recycled and microorganisms in the stage consume the wastewater nutrients. In some advanced systems, the effluent is further treated by a biological nitrification-denitrification process for the removal of nitrogen. During nitrification, the ammonia content of the influent is converted to nitrate, utilizing the organic carbon content of the wastewater. During denitrification, the nitrate is converted to gaseous nitrogen, also requiring the use of organic carbon. In many instances, the effluent from nitrification does not contain sufficient organic carbon for effective denitrification. Accordingly it is frequently necessary to add supplemental organic carbon to the denitrification zone, commonly in the form of methanol.

One improvement of the above system is by the use of activated sludge with alternate aerobic and anaerobic stages in which incremental reduction in the organic carbon and nitrogen content of the wastewater is accomplished in each stage. It is possible in this system to maintain the organic carbon in the latter stages at a sufficient level for denitrification without adding an additional source of carbon such as methanol. A system of this type is disclosed in an article by Barnard, J. L. entitled "Biological Nutrient Removal Without The Addition of Chemicals", *Water Research* (Pergamon Press), Vol. 9, pages 485–490 (1975). Another system similar to the above Barnard system is disclosed in a paper by Drews, J. L. C., et al in *Water Research* Pergamon Press, 1973, Vol. 7, pp. 1183–1194. This paper discloses that nitrogen may be eliminated from sewage effluent in an orbital system by rapid alternation of aerobic and anaerobic conditions.

One problem with any activated sludge system is the operation of handling large amounts of sludge. Another problem with such systems is that activated sludge is known to be highly sensitive to variations in pH level, temperature, nutrient concentration changes, and toxicity shifts and other biological growth-influencing shifts.

In another type of wastewater treatment system, microorganisms are supported on fixed growth media for digestion of the wastewater nutrients (including carbon). For example, in B. F. Goodrich Information Bulletin VC 2.1-276, there is a disclosure of both aerobic digestion and nitrification in a reactor media in which microorganisms grow in a fixed film on sheet-like media. There is a further disclosure that the same type of media could be used in an anaerobic fixed film reactor for denitrification of previously nitrified wastewaters. However, there is no suggestion of the use in combination of these two different types of reactors.

SUMMARY OF THE INVENTION AND OBJECTS

It is an object of the invention to provide an economical efficient wastewater treatment system for producing effluent of exceptional purity.

It is a particular object of the invention to provide a system of the foregoing type which reduces sludge handling requirements in comparison to activated sludge treatment.

It is a further object of the invention to provide such a system capable of nitrification-denitrification without the requirement of adding organic carbon fuel to the denitrification zone.

It is another object of the invention to provide such a system relatively more tolerant of variations of pH, nutrient concentrations, temperature levels, toxicity shifts, and other biological growth-influencing shifts, than activated sludge systems.

It is an additional object of the invention to provide such a system in which the risk of clarifier breakthrough is minimized, specifically by using multiple clarifiers in series and by improving the settling characteristics of the sludge.

Further objects and features of the present invention will be apparent from the following description taken in conjunction with the appended drawings.

In accordance with the above objects, a wastewater treatment system has been provided which includes primary, secondary and tertiary treatment. Secondary treatment is performed by passing the wastewater sequentially through at least two pairs of alternate aerobic-anaerobic fixed media bioreactors. The nutrients of the wastewater are digested by microorganisms growing in fixed films on the walls of fill which defines multiple wastewater channels. In a first aerobic zone, the wastewater gravitates as films downwardly over the microorganisms to cause incremental consumption of the carbon content of the wastewater and incremental oxidation of the ammonia nitrogen to nitrate nitrogen. The effluent is passed to the anaerobic reactor of the pair and passes upwardly through the fill for contact with submerged microorganisms on the channel walls causing further incremental consumption of the carbon and conversion of the nitrate nitrogen to nitrogen gas. The same general conditions are maintained in the remaining aerobic-anaerobic pairs so that there is further incremental consumption. In this system, denitrification can generally be performed without the addition of supplemental carbon. Also, in contrast to an activated sludge system, sludge generation is reduced due to the longer retention times of bacteria. Further, the use of multiple aerobia-anaerobic pairs, coupled with the unique design of the anaerobic reactors permits incremental settling of the sludge thereby reducing nutrient loading on succeeding stages, improving sludge characteristics, and also minimizing the probability of clarifier breakthrough.

BRIEF DESCRIPTION OF THE DRAWING

FIG. 1 is a schematic flow diagram of apparatus suitable for performing the method of the present invention.

DETAILED DESCRIPTION OF THE PREFERRED EMBODIMENTS

In the system of the present invention, microorganisms are utilized for consumption of the nutrients in wastewater under alternate aerobic and anaerobic conditions. Such microorganisms are supported on sheetlike surfaces defining channels through which the wastewater flows in intimate contact with the microorganisms. They comprise a biomass or biota which are present in the wastewater and deposit on the surfaces during passage of the wastewater for growth into films. If desired, the microorganisms may be seeded into flowing wastewater to increase the rate of initial film growth. While bacteria comprise a major component of the microorganisms in the biota, other ones include fungi, algae, protozoa, nematoda, rotatoria, chaetopoda, crustacea, arachnida, and insecta. Suspended and dissolved nutrients in the wastewater which contact such microorganism films are converted by them into additional growing film material and also completely oxidized or reduced to gaseous end products (e.g., $CO_2$, $N_2$), and thus removed from the wastewater stream.

The microorganisms in the film adjacent to the support surfaces receive the least nutrient while those in the exposed surface receive the most. Thus, after a sustained period of growth, during which the film my achieve a substantial thickness, the microorganisms adjacent to the support wall die and lose their adherent property and the microorganism film sloughs off from the wall. Then, a fresh microorganism film is formed in its place by the passing wastewater. This growth pattern prevents excessive film thickness which could clog the wastewater channels.

A wide variety of wastewaters from both municipal and industrial sources may be treated in accordance with the present invention so long as they contain suspended and dissolved nutrient to be removed from the wastewater. A common wastewater to be treated is sewage from a municipal source which contains dissolved, suspended and colloidal organic matter to be removed. Typically, such wastewater includes a biological oxygen demand (BOD) of at least 100–150 ppm to as high as 400 ppm or more after treatment in the primary stage.

FIG. 1 illustrates apparatus suitable for performing the method of the present invention. It includes primary, secondary and tertiary stages of treatment.

PRIMARY TREATMENT STAGE

In the primary stage, the wastewater influent is treated for the removal of flotable and settleable solids and includes some preliminary biological treatment as well. In a typical first stage, the influent is first passed through a bar screen 10 to remove very large solids and hold them for later collection. Then, the wastewater is passed to a grit chamber 12 which settles most of the dense abrasive solids to the bottom of the tank. Such solids are also periodically removed. Chamber 12 includes an outlet conduit 14 connected by a grinder pump 16 to an equalization chamber 18. A level control pump 20 is disposed in the lower portion of chamber 18 and is connected to conduit 22 which carries liquid from the lower portion of the chamber to primary sedimentation chamber 24. A weir 25 formed by extending conduit 22 upwardly is provided in equalization chamber 18 so that excess flow splashes into that chamber rather than disturbing the quiescent conditions desirable in sedimentation chamber 24. Also, the weir establishes the head for the system.

Equalization chamber 18 provides surge capacity to the system so that when the inflow exceeds the desired process flow rate for the system, as during peak loads, the wastewater can be stored in equalization chamber 18 for subsequent treatment during lower load times. An advantage of the system is that it employs a constant process through flow rate. As will be described below, this optimizes the functioning of the microorganisms, of the settling of the solids, and also the efficiency of tertiary treatment. Such constant process flow rate serves to create quiescent conditions in primary sedimentation chamber 24. This provides good settling capabilities for suspended solids and so creates clarifying conditions. The solids accumulate in the bottom of the chamber which is of sufficient volume that solids may be retained there for long periods of time prior to removal as from an outlet at the bottom of the vessel or by pumping. It is apparent that very little oxygen penetrates to the sludge at the bottom of chamber 24 and so anaerobic conditions are maintained. This enables long retention digestion of the nutrients in the sludge. Thus, chamber 24 serves as a combination upflow clarifier and long term (e.g., 3 weeks to several months) anaerobic digestor for sludge. Chamber 24 constitutes the last stage of primary treatment in the present system. Chambers 12, 18 and 24 are suitably cylindrical or rectangular tanks formed of reinforced concrete, plastic coated steel, or fiber reinforced plastic.

SECONDARY OR BIOLOGICAL TREATMENT STAGE

The next portion of the system described herein comprises biological treatment in the aerobic and anaerobic modes. This type of treatment is generally termed secondary treatment, although the efficiency of the present invention is such that it constitutes part of what is commonly considered tertiary treatment in terms of BOD removal and nitrification and denitrification.

Referring again to FIG. 1, the effluent from sedimentation chamber 24 is carried by an outlet conduit 26 disposed in the upper portion of the chamber into the lower portion of the first aerobic bioreactor vessel 28. This vessel and the other aerobic ones are suitably of the same type as in the primary treatment stage. In vessel 28, the wastewater is drawn by pump 32 into a recycle line 34 and into distribution header 36 provided with single or multiple outlet openings for spraying the wastewater downwardly over fill 38 supported in the central portion of the vessel. A compartment is defined by upstanding weir 40 which may extend across the bottom of vessel 28. The chamber serves to permit mixing of the influent wastewater with the recycle water and to prevent short circuiting of the influent wastewater from conduit 26 to conduit 44 without treatment. The capacity of pump 32 in excess of the through flow rate determines the recycle ratio in vessel 28.

One important function of the recycle line is to control the concentration of nutrients flowing through fill 38. Without a recycle line, a high concentration of nutrients in the wastewater could cause the microorganism films 48 to become very thick and possibly plug channels 47. In addition, if the pH, temperature or nutrient content of influent wastewaters should suddenly become substantially different from that of the previous conditions, a shock reaction could occur which would damage the microorganisms. Recycling reduces the rate of change of process conditions. Recycling also permits control of the nutrient level so that the films are thinner and somewhat more stable. This is a particular advantage in the first stage. Toward the front end of the system as in vessel 28, the recycle ratio is typically higher than downstream because the nutrient level is highest at the beginning of treatment. Suitable recycle ratios are on the order of 4:1 to 0.5:1, depending on the nutrient level and wastewater channel dimensions.

Vessel 28 serves to treat the gravitating wastewater by microorganisms growing on fill 38 as described below. Sufficient oxygen-containing gas (air) must be provided for maintaining this aerobic condition. This may effectively be accomplished by pumping the air at a suitable temperature and rate for aerobic activity of the microorganism through line 42 disposed above the level of wastewater at the bottom of the vessel and thus above weir 40 but below fill 38 and flowing the air upwardly through the fill countercurrently to the gravitating wastewater. Such air may be removed from vessel 28 by a suitable outlet, not shown. Under certain circumstances, the air may flow concurrently with the water flow.

Maintenance of aerobic conditions in vessel 28 permits biological oxidation of ammonia nitrogen to the nitrate form. Selection of through flow and recycle rates, relative to the physical size of the reactor and the average nutrient content of the wastewater being treated insures that substantial fractions of the ammonia present in the influent will be oxidized (nitrification), but consumption of excess carbon beyond that needed to achieve such nitrification will be held to a minimum.

The optimum incremental amount of carbon consumption in each aerobic reactor is defined as that just necessary to the attainment of essentially complete oxidation of ammonia present in the wastewater. Typical increment consumption of nutrients can vary as high as 50% from this optimum level under normal operating conditions.

Referring again to FIG. 1, fill 38 is preferably of a type which includes multiple spaced sheets 45 with surfaces suitable for the growth of microorganisms. Such sheets define multiple channels 47 suitable for flow of wastewater and for countercurrent or concurrent flow of air. Thus, as illustrated, the fill includes essentially vertical channels. The fill is formed of a material upon which microorganisms self-adhered firmly to grow into fixed microorganism films 49 on both sides of sheets 45. Plastic materials such as polyvinylchloride are particularly suitable for this purpose. For intimate contact between the microorganism film 49 and the gravitating wastewater, the wastewater should gravitate in at least partially film form downwardly along the sheets. It is also preferable to include a relatively large void volume in the fill to eliminate plugging by excessive film build-up with resultant ponding and short circuiting by build-up with resultant ponding and short circuiting by wastewater flowing in streams or turrents. In the absence of ponding, there is no opportunity to build an anaerobic condition in the tower with its resulting objectionable odor and possible disruption of the system balance.

A variety of fill can be employed to accomplish the above objectives. One effective fill is a honeycomb-like material sold under the trade designation "Vinyl Core" by B. F. Goodrich General Products Company. This product has an effective surface area of about 30 square feet per cubic foot and is suggested for use for carbonaceous BOD removal in an aerobic mode. Another type of fill or media is sold under the trade designation "Koro-Z" by the same company. It has an effective surface area ranging from about 44 to 65 square feet per cubic foot and is suggested for use under anaerobic conditions.

Fill 38 can be formed of corrugated sheets 45 with ridges and grooves disposed so that ridges of adjacent sheets cross and abut against the ridges disposed between alternate sheets to form channels 47 therebetween. Alternatively, spacers may be provided between the corrugated sheets. In a further alternative, flat sheets may be provided with spacers between adjacent sheets and disposed in a general vertical direction. The channels formed by corrugated sheets may have a variety of cross-sectional configurations, such as triangular, cylindrical, oval, rectangular or combinations of them.

The type of fluid flow in fill 38 is similar to that of conventional rocks or discrete formed plastic shapes used in trickling filters in that the wastewater forms into thin films for intimate contact with the microorganisms. However, the media formed of the foregoing type of sheets is far more suitable for use in systems designed for unattended operation, is much less susceptible to plugging and does not require periodic backwashing. To minimize the size of the bioreactor, it is preferable to maximize the surface area of the sheets per unit volume. On the other hand, it is important that at maximum thickness of the growing microorganism film, there is still a sufficient spacing in the wastewater channels to permit wastewater to flow downwardly along the channel walls as independent films with space for substantial quantities of flowing air. Assuming a maximum microorganism thickness of about 0.5 inch, it is preferable to provide a channel with about a 2 inch mean diameter to accommodate maximum film growth in at least the first aerobic reactor. Under the above criteria, suitable surface area to volume ratios are on the order of 20 to 50 sq. ft. per cu. ft. in the first two aerobic stages depending on the nutrient content, and 40 to 80 sq. ft. per cu. ft. in subsequent aerobic stages.

The flow of wastewater in vessel 28 should be adjusted to provide wetting in a thin film of the microorganism fills on the channel walls. On the other hand, the flow should be insufficient to cause a scouring action which would possibly remove some of the microorganisms. Suitable flow rates range from 0.5 to 1.5, and optimally about 1, gpm/sq. ft. of tank cross-section surface area. A substantial flow of air containing oxygen in excess of the amount of oxygen demand (e.g., at least 50 times) is used in this vessel.

The effluent from the bottom of first aerobic bioreactor vessel 28 is directed via conduit 44 into first anaerobic bioreactor vessel 46 by gravity, or by pumping if the levels do not permit full gravity flow. In the illustrated configuration, vessel 46 is cylindrical with an inverted generally conically shaped bottom 46a. Fill 48, which may be of a similar type to fill 38 in vessel 28, is supported centrally in the vessel. To maintain anaerobic conditions, fill 48 is submerged in wastewater during operation. Accordingly, the wastewater is transmitted to an inlet below fill 48 for removal at an outlet 50 above the media. For uniform distribution of liquid across a cross-section below the media, a vertical pipe section 52 interconnects inlet 44 to a generally horizontal distributional header 54 with multiple openings disposed below fill 48.

Referring to the broken away expanded portion of vessel 28, the same type of fill 48 may be employed in vessel 46 with growth of microorganisms on both sides of the channel walls of sheets 45. A major difference in the process is that the microorganisms grow in an anaerobic environment and so are an anerobic type in comparison to the media in fill 38 in which they grow in the presence of oxygen and so are of an aerobic type. The reason for coupling the aerobic and anaerobic vessel 28 and 46 will be described more fully below.

In the illustrated embodiment, vessel 28 is disposed above vessel 46 so that wastewater flow through conduit 44 is assisted by gravity. As the outlet at conduit 50 is at the same general elevation as pipe 44, pumping is minimized. On the other hand, if it is desired to dispose the tanks at the same level, the wastewater may be pumped between aerobic and anaerobic vessels.

An unfilled chamber is formed below fill 48 in vessel 46 to create quiescent conditions for the settling of solids and to create a basin, preferably conical, in which solids may accumulate for periodic removal. Wastewater flows upwardly from header 54 disposed substantially above the vessel bottom so that the solids can remain settled in a relatively quiescent condition. Such solids include those initially suspended in the wastewater together with microorganisms which die and slough away from the support surfaces during operation. Thus, vessel 46 serves multiple functions—(a) as an anaerobic digestor of the nutrients in the wastewater, (b) as an upflow tube-type clarifier to remove suspended solids, and (c) as an incremental denitrifying reactor, as will be described more fully below. Solids may be removed from the bottom periodically or continuously, preferably for return to primary sedimentation chamber 24 where they settle and are anaerobically digested. Referring to FIG. 1, the sludge may be withdrawn through conduit 56 via a pump (not shown) and passed in line 58 into the lower portion of chamber 24.

A major advantage of the clarifying function in the multiple series of anaerobic bioreactor vessels is that the biodegradable solids but not the non-biodegradable ones are consumed. Thus, the ratio of biodegradable to non-biodegradable solids is reduced; thereby improving the sludge settling characteristics and, thus, reducing the chances for clarifier breakthrough.

The nitrified influent to the anaerobic reactor is denitrified by action of the anaerobic bacteria under optimum conditions. Fill design parameters relative to wastewater quality and flow rates are selected so that substantially all of the nitrates present will be reduced to molecular nitrogen (denitrification) but consumption of excess carbon beyond that required to achieve such denitrification will be held to a minimum.

The effluent from vessel 46 is directed to the bottom of second aerobic bioreactor vessel 60 which may be of the same type as vessel 28. Briefly described, vessel 60 includes a pump 62 for recycling wastewater through conduit 64 to header 66 disposed over the top of supported fill media 68. A weir 70 serves as a partition to prevent short circuiting and permit recycle. As illustrated, air flows from the same external source as vessel 42 to the bottom of vessel 60 via air inlet 72 and upwardly through it countercurrently to the gravitating downwardly flowing wastewater.

The fluid mechanics occuring in vessel 68 are generally the same as those described with respect to vessel 28. One important difference is that the nutrient content in this second aerobic bioreactor vessel is significantly reduced from that of the first one. Accordingly, if desired, the fill surface area to volume ratio may be increased as the maximum thickness of the microorganism film growth is correspondingly less. Increasing this ratio permits a decrease in tank size.

In the next stage, wastewater from vessel 60 passes via conduit 74 into second anaerobic bioreactor vessel 76 which is of the same general type as anaerobic bioreactor 46 and is generally cylindrical including a similar conical bottom section 76a. Thus, wastewater flow proceeds downwardly through vertical pipe 78 for distribution through multiple openings in header 80 for passage upwardly through fill 82 which is continuously immersed in wastewater. A conduit 84 is provided for the periodic or continuous removal of sludge for return to primary sedimentation chamber 24 in line 58.

Flow from vessel 76 proceeds via conduit 84 to third bioreactor vessel 86 which may be of the same general type as vessel 28 which serves a similar function. Thus, vessel 86 includes a recycle line 88 and accompanying pump 90, a distribution header 92, film 94, a weir 96 and air inlet 98. As with vessel 60, it is possible to use a still higher surface area to volume ratio, if desired, because of the lower nutrient level in this vessel.

Effluent from third anaerobic bioreactor vessel 86 is directed via conduit 100 to third anaerobic vessel 102 of a similar type to vessel 46. Vessel 100 includes a conical bottom 120a and the wastewater is directed from conduit 100 downwardly through vertical pipe 104 into distribution header 106 for upward flow through supported fill 108 and outlet opening 110. Sludge from the conical bottom is directed upwardly through line 112 for passage into conduit 58 and return to chamber 24.

Employment of multiple pairs of reactors as herein described coupled with integral clarifiers between stage pairs, provides a wastewater secondary treatment system with
(a) high resistance to shock upset,
(b) intrinsic capability to both nitrify and denitrify without the requirement for either;
(1) monitoring carbon:ammonia:nitrate ratios so as to enable continuously readjusting operating conditions; or
(2) as is more commonly practiced, carrying nitrification to the point of essential depletion of carbon, with subsequent introduction of supplemental carbon to achieve denitrification; and
(c) multiple incemental removal of suspended solids to:
(1) reduce the chances of reactor plugging and permit use of higher surface area-to-volume fill material; and
(2) reduce the chances for clarifier breakthrough as frequently experienced with single stage clarifier systems.

While secondary treatment is illustrated utilizing three pairs of aerobic-anaerobic vessels, it should be understood that, for specialty applications, only two pairs may be employed. Also, for the highest quality effluent or for high BOD wastewater, four or more aerobic-anaerobic pairs are employed. It should be understood that multiple aerobic or anaerobic vessels may be employed to comprise a single corresponding aerobic and anaerobic stage under special circumstances.

TERTIARY TREATMENT STAGE

The effluent from vessel 102 is removed in line 110 for tertiary treatment if desired. Conventional tertiary treatment may be utilized in conjunction with such biological treatment.

Referring to FIG. 1, one preferred form of tertiary treatment comprises the steps of chlorination followed by filtration, first stage ozonation, second stage chlorination and multiple stage ozonation. The effluent from secondary treatment or vessel 102 is directed through outlet line 110 to static mixer 112 where chlorine is added to reduce remaining BOD and partially disinfect the wastewater. Chlorinated wastewater is directed through conduit 114 to a conventional high rate and filter unit 116. The filter unit serves to remove turbidity, phosphates, and to further reduce BOD.

A suitable sand filter unit as illustrated has a continuous upflow of wastewater which is removed by conduit 118. The dirtiest sand is continuously withdrawn from the lower part of the bed, washed and returned to the top part of the bed. This means that the filter does not have to be taken out of operation for backwashing. A small portion of the product water is used as washwater. This stream is returned by conduit 110 to first aerobic reactor 28.

The sand bed moves slowly downwardly and countercurrent filtration takes place. Fouled sand is pumped to a sand washer by an air-lift pump. The clean sand emerging from the washer is evenly spread on the filter bed. The filtered effluent leaves the filter as overflow via conduit 118. The wastewater may bypass the sand filtration unit via a gravity bypass line 124, as a safety factor, say if the filter is plugged or if the air lift pump fails owing to a power outage or for some other reason.

Filtered water then proceeds to a staged ozone contactor unit 126 where air containing typically 1 to 2% ozone is injected as fine bubbles into multiple (e.g., 6) vertical columns connected in series with ozone flow decreasing as contaminants are reduced at each stage. Foam breaking and extraction is by motor driven radial blade type impeller. Collapsed foam is returned to the first aerobic reactor. Additional chlorine is added by static mixing following the first ozonation column. Dechlorination is accomplished internally by gas stripping in succeeding ozonators. A suitable system of this type is described in a patent application entitled APPARATUS AND METHOD FOR THE TREATMENT OF LIQUORS, Ser. No. 021,430, U.S. Pat. No. 4,233,152, filed simultaneously herewith.

In the chlorination-ozonation reactor 126, detergents are foam stripped together with pesticides and surface charge bearing chemical bio-refractories and suspended matters. In addition, the water is disinfected and the effluent is saturated with oxygen. Furthermore, color and odor are eliminated.

Referring to ozonation, gaseous ozone is introduced for the purpose of reducing the BOD and chemical oxygen demand (COD) to low levels prior to final discharge. Toxicity of the oxidizable chemical contaminants is reduced together with physical removal of colloidal or suspended solids. During treatment with ozone, a foam is formed which is broken and separated from the main liquid by means described in the aforementioned patent application.

While the foregoing description refers to a preferred form of tertiary treatment, it should be understood that other tertiary treatment can be employed without departing from the scope of the present invention.

OPERATING CONDITIONS

Referring to FIG. 1, a typical wastewater as from municipal sewage is directed to the primary stage of treatment. Large solids are removed by bar screen 10, smaller dense solids are settled out in grit chamber 12 and remaining solids are pulverized in grinder pump 16. It is assumed that there is no substantial reduction of BOD or suspended solids in this stage. Then, the wastewater is directed into equalization chamber 18 provided as protection against shock loading and to permit constant through flow rate. Thereafter, the wastewater is directed via pump 20 into sedimentation chamber 24 wherein typically about 30 to 35% of the BOD and 50 to 60% of suspended solids of the wastewater are removed to primary sludge. There, the sludge is digested under anaerobic conditions by long retention, e.g., typically 3 to 4 weeks. Recycle sludge streams from secondary and tertiary treatments are returned to accumulate and be digested at the bottom of this primary sedimentation chamber. Effluent from this last stage of primary treatment is directed to the first stage of secondary treatment. The influent to this first stage includes greater than 30 ppm BOD and normally greater than about 100 ppm BOD and 100 ppm suspended solids, while a typical influent is on the order of 200 ppm BOD and 140 ppm suspended solids.

In general, the illustrated secondary treatment includes three pairs of aerobic and anaerobic reactor vessels described above which act as complementary pairs. It is preferable for incremental reduction of the nutrients to occur in each phase of secondary treatment. Suitably, the reduction in BOD in each staged pair is about 30-90%, and preferably about 60-75%. In the early stages of a typical wastewater, the microorganisms consume a large proportion of the organic carbon content in comparison to nitrogen removal. In contrast, in the latter stages, where the organic carbon content has been significantly lowered, removal of nitrogen becomes the primary reaction. This is because there is a competition between types of microorganisms which favors growth of heterotrophic forms in the presence of high levels of carbon and the growth of autotrophic forms at relatively lower levels of carbon. Some nitrification is accomplished in each of the aerobic stages and some denitrification in each of the anaerobic stages. However, the most significant nitrification and denitrification occurs after the consumption of a substantial fraction of the carbon.

An important feature of the invention is that there is an incremental reduction in the carbon and nitrogen content in each stage. For example, a preferred reduction is on the order of 60 to 75% BOD and suspended solids reduction in each aerobic-anaerobic pair. In this manner, sufficient organic carbon is normally present for final denitrification in the last anaerobic stage without the requirement for adding an additional source of organic carbon. The system is self-balancing to a high degree with respect to maintaining adequate available carbon for nitrification and denitrification over a wide range of influent nutrient concentration and carbon-nitrogen ratios.

Suitable operating conditions for this system include a temperature range of about 50° to 70° F. and a hydraulic loading of the aerobic unit of about 1 gpm/sq. ft. Upwelling flow through the anaerobic unit may be about 400 gpm/sq. ft. of surface area to insure settling of suspended solids. A recycle on the order of 0.5-4:1 and preferably about 1:1 in the aerobic stage reduces the probability of destroying the microorganisms by sudden shocks from variations in the wastewater feed characteristics. Use of fixed media with recyle also reduces solids generation from a typical level experienced in activated sludge systems on the order of 70% of BOD weight to about 30%. At the lower nutrient levels created by such recycle, and relatively high surface area to through flow rates, sloughing of microorganisms and channeling of wastewater is minimized.

The number of stages employed is determined by the influent quality and effluent standards. Three aerobic-anaerobic stages are typical while four stages may be employed for exceptionally high effluent BOD, refractory wastewaters, or stringent discharge requirements. A suitable retention time in each stage may be on the order of 4–8 hours and typically about 6 hours.

If desired, alum and polyelectrolyte may be added, in or immediately prior to, one or more anaerobic bioreactor vessels for enhanced removal of suspended solids and phosphates. This is possible because the anaerobic vessels also serve as clarifiers, and solids may be removed from the bottom of each stage. Clarification in the multiple anaerobic vessels reduces loading and protects against breakthroughs common to single stage final clarifiers.

As set forth above, one of the advantages of the system is the elimination of the necessity for supplemental organic carbon addition to accomplish nitrification and denitrification for most common wastewaters. However, some wastewaters may be exceptionally low in organic carbon content and may require auxiliary injection of a source of organic carbon such as methanol for enhanced denitrification in the final anaerobic reactor. If so, the amount of methanol required by the present incremental system would be far less than that involved in a conventional nitrification-denitrification system, due in part to the efficient use of carbon in the incremental alternation system, and in part to the reduction in carbon consumed by sludge generation by the use of fixed media.

Another advantage is that the system is capable of gravity flow from introduction into grit chamber 12 to discharge of the final effluent. This permits operation of the system to perform primary and limited secondary treatment, even if there is a power outage for a substantial time period.

In the tertiary treatment stage, the effluent may be directed to a filtration unit as of the type described above. Typical effluent quality from this stage is less than 2 ppm BOD and suspended solids and less than 1 ppm phosphorus, nitrates and ammonia.

Referring to the chlorinator-ozonator foam fractionator, the effluent quality is essentially sterile water. It contains residual chlorine at less than 0.1 ppm with no color and with negligible detergents and few, if any, other dissolved or suspended organic contaminants.

It is apparent that in the described system, all sludge is returned to primary sedimentation chamber 24 maintained under anaerobic conditions. This chamber serves in a manner analogous to a septic tank. It has sufficient capacity for long term retention to promote digestion and concentration. By way of example, calculations have been performed to illustrate the reduction in BOD and suspended solids content at 60% and 75% in each stage of aerobic-anaerobic pairs for a four stage system assuming various influent BOD and suspended solids content for the wastewater. The results are set out in the following table.

TABLE I

| INFLUENT BIOLOGICAL OXYGEN DEMAND (BOD) AND SUSPENDED SOLIDS (SS) | | 250 ppm | | 400 ppm | | 600 ppm | |
|---|---|---|---|---|---|---|---|
| | | BOD | SS | BOD | SS | BOD | SS |
| Primary Treatment Effluent (assumes only 30% removal of BOD and 60% removal of SS) | ppm | 175 | 100 | 280 | 160 | 420 | 240 |
| Secondary Stage #1 Effluent (60% removal/75% removal) | ppm | 70/43.8 | 40/25 | 112/70 | 64/40 | 168/105 | 96/60 |
| Secondary Stage #2 Effluent (60% removal/75% removal) | ppm | 28/10.9 | 16/6.25 | 45/17.5 | 25.6/10 | 67.2/26.3 | 38.4/15 |
| Secondary Stage #3 Effluent (60% removal/75% removal) | ppm | 11.2/2.7 | 6.4/1.6 | 18/4.38 | 10.24/2.5 | 26.9/6.6 | 15.4/3.75 |
| Secondary Stage #4 Effluent (60% removal/75% removal) | ppm | 4.5/0.7 | 2.6/0.4 | 7.2/1.1 | 4.1/0.06 | 10.8/1.6 | 6.1/0.94 |
| Filter Effluent | ppm | <2/<1 | <2/<1 | <2/<1 | <2/<1 | <5/<1 | <3/<1 |
| Ozonation/Foam Fractionation Effluent (Product Waters) | ppm | <1/<1 | <1/<1 | <1/<1 | <1/<1 | <1/<1 | <1/<1 |

What is claimed is:

1. In a method for the treatment of industrial or municipal wastewater of a type including organic carbon and nitrogen-containing nutrients, the steps of
   (a) forming a plurality of aerobic zones, each zone including multiple channels defined by spaced-apart exposed support surfaces upon which aerobic microorganisms grow in fixed films,
   (b) forming a plurality of anaerobic zones, each zone including multiple channels defined by spaced-apart exposed support surfaces upon which anaerobic microorganisms grow in fixed films, said aerobic zones and anaerobic zones being arranged in a series of alternate aerobic and anaerobic zone pairs including at least a first aerobic-anaerobic zone pair and a last aerobic-anaerobic zone pair,
   (c) passing said wastewater into the upper portion of said first aerobic zone and causing it to flow downwardly through said channels under the influence of gravity in at least partially film form exposed to air along said aerobic microorganisms fixed films on their support surfaces for intimate contact between said aerobic microorganisms and said wastewater in the presence of oxygen to thereby cause incremental consumption of the organic carbon nutrients and incremental conversion of organic nitrogen nutrients to ammonia and nitrification of the thus-formed ammonia to nitrate,
   (d) passing the treated wastewater as a stream from said first aerobic zone to said first anaerobic zone in which said anaerobic microorganism film is submerged in an anaerobic environment and causing said wastewater stream to flow through said channels past said anaerobic microorganism fixed films for intimate contact to cause further incremental consumption of said organic carbon nutrients and incremental denitrification of nitrate to nitrogen gas,
   (e) passing the effluent from the first anaerobic zone to the upper portion of the last aerobic zone and causing it to flow downwardly through said channels under the influence of gravity in at least partially film form exposed to air along said aerobic microorganisms fixed film on their support surfaces for intimate contact between said aerobic microorganisms and said wastewater in the presence of oxygen to thereby cause further incremental consumption of the organic carbon nutrients and incremental conversion of organic nitrogen nutrients to ammonia and nitrification of the thus-formed ammonia to nitrate, (f) passing the effluent from the last aerobic zone to the last anaerobic zone in which said anaerobic microorganism film is submerged in an anaerobic environment and causing said wastewater stream to flow through said channels past said anaerobic microorganism fixed films for intimate contact to cause further incremental carbon consumption of the organic carbon nutrients and incremental denitrification of nitrate to nitrogen gas, sufficient organic carbon being present in the effluent directed to the last anaerobic zone to cause significant denitrification to occur therein.

2. The method of claim 1 in which the wastewater fed to step (a) includes at least 30 ppm of biological oxygen demand.

3. The method of claim 1 in which prior to step (a), the wastewater is subjected only to primary wastewater treatment.

4. The method of claim 1 in which solid particles in the wastewater sediment in at least the first anaerobic zone are settled and withdrawn as a sludge stream separate from the remainder of the wastewater stream.

5. The method of claim 1 in which at least a portion of the wastewater treated in the first aerobic zone is recycled to the upper portion of said zone for further treatment.

6. The method of claim 1 in which the wastewater generally flows downwardly in the channels of the aerobic zones and flows generally upwardly in the channels of the anaerobic zones.

7. The method of claim 1 in which sufficient organic carbon is present in the influent to the last anaerobic stage so that the desired degree of denitrification occurs therein without adding a supplemental source or organic carbon.

8. The method of claim 1 in which the wastewater from the aerobic zones is collected in a quiescent zone to remove oxygen prior to passing to said anaerobic zones.

9. In a method for the treatment of industrial or municipal wastewater of a type including nutrients in at least two pairs of aerobic-anaerobic zones, the steps of (a) passing said wastewater into a first aerobic zone and including multiple channels defined by spaced-apart exposed surfaces upon which microorganisms grow under aerobic conditions in fixed films so that the wastewater flows through said channels past said fixed film microorganisms for intimate contact to thereby cause incremental consumption of the oxidizable nutrients, (b) passing the effluent as a stream from the first aerobic zone to a first anaerobic zone including multiple channels defined by spaced-apart exposed surfaces upon which microorganisms grow a fixed film submerged in an anaerobic environment and causing said wastewater stream to flow through said channels past said fixed film microorganisms for intimate contact to cause further incremental consumption of said nutrients, (c) passing the effluent from said first anaerobic zone to a second aerobic zone and including multiple channels defined by spaced-apart exposed surfaces upon which microorganisms grow under aerobic conditions in fixed films so that the wastewater flows through said channels past said fixed film microorganisms for intimate contact to thereby cause further incremental consumption of the nutrients, (d) passing the effluent from said second aerobic zone to a second anaerobic zone and including multiple channels defined by spaced-apart exposed surfaces upon which microorganisms grow under aerobic conditions in fixed films so that the wastewater flows through said channels past said fixed film microorganisms for intimate contact to thereby cause further incremental consumption of the nutrients.

* * * * *